United States Patent [19]

Freter et al.

[11] 3,728,460

[45] Apr. 17, 1973

[54] ANORECTIC PHARMACEUTICAL COMPOSITION CONTAINING CERTAIN α-(METHYLAMINO-METHYL)-ALPHA-(4'-HALO-PHENYL)-BENZYL ALCOHOLS AS ACTIVE INGREDIENTS

[75] Inventors: Kurt Freter, Beaconsfield; Manfred Götz, Hudson; James T. Oliver, Beaconsfield, all of Canada; Karl Zeile, Ingelheim/Rhine, Germany

[73] Assignee: Boehringer Ingelheim G.m.b.H., Ingelheim am Rhine, Germany

[22] Filed: July 13, 1971

[21] Appl. No.: 162,299

Related U.S. Application Data

[63] Continuation-in-part of Ser. No. 785,750, Dec. 20, 1968, Pat. No. 3,635,974.

[52] U.S. Cl. ...............424/330, 424/253, 424/280, 424/300, 424/301, 424/324
[51] Int. Cl. ..........................................A61k 27/00
[58] Field of Search......................................424/330

[56] References Cited

FOREIGN PATENTS OR APPLICATIONS

| 984,363 | 2/1965 | Great Britain.......................260/570 |
| 6,606,390 | 11/1966 | Netherlands........................260/570 |

OTHER PUBLICATIONS

Burger, Medicinal Chemistry 2nd Edition, pp. 42–43 1960.

*Primary Examiner*—Albert T. Meyers
*Assistant Examiner*—Norman A. Drezin
*Attorney*—Hammond & Littell

[57] ABSTRACT

Anorectic pharmaceutical compositions containing as an active ingredient a compound of the formula

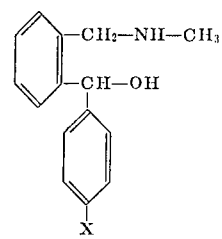

wherein $X$ is chlorine or fluorine, or a non-toxic acid addition salt thereof; and a method of curbing the appetite of warm-blooded animals therewith.

2 Claims, No Drawings

ANORECTIC PHARMACEUTICAL COMPOSITION CONTAINING CERTAIN α-(METHYLAMINO-METHYL)-ALPHA-(4'-HALO-PHENYL)-BENZYL ALCOHOLS AS ACTIVE INGREDIENTS

This is a continuation-in-part of copending application Ser. No. 785,750, filed Dec. 20, 1968, now U.S. Pat. No. 3,635,974 issued Jan. 18, 1972.

This invention relates to novel anorectic pharmaceutical compositions containing certain 2-(methylamino-methyl)-α-(4'-halo-phenyl)-benzyl alcohols as active ingredients, as well as to a novel method of curbing the appetite of warm-blooded animals therewith.

More particularly, the present invention relates to anorectic pharmaceutical compositions containing as an active ingredient a compound of the formula

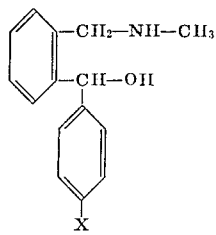

(I)

wherein $X$ is chlorine or fluorine, or a non-toxic, pharmacologically acceptable acid addition salt thereof.

The compounds embraced by formula I may be prepared by a number of different methods involving well known chemical principles, among which the following have proved to be particularly convenient and efficient:

METHOD A

By ring cleavage of a phthalide with an amine, and subsequent reduction of the acid amide formed thereby, pursuant to the following reaction formula

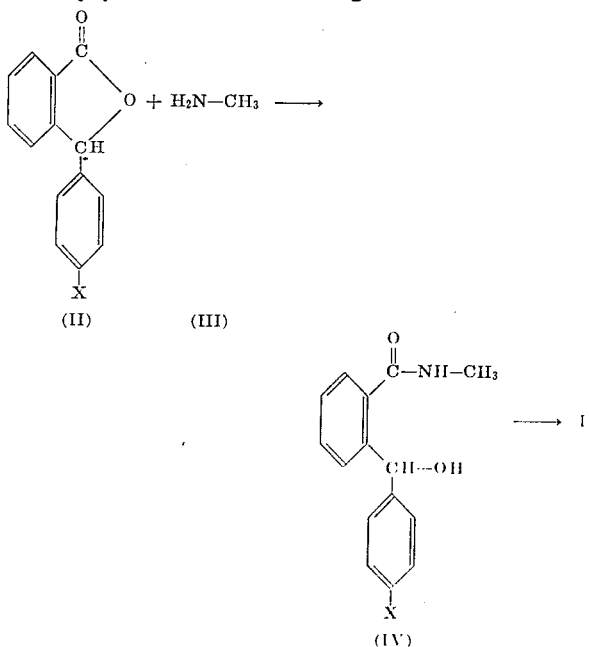

wherein $X$ has the same meanings as in formula I.

For this reaction a solution of a phthalide of the formula II in an inert solvent, such as an alcohol, benzene, toluene or xylene, is first combined with methylamine. Since the amine III is a liquid, the reaction may also be performed without the addition of a solvent. In some cases the reaction proceeds at room temperature, but in general it is more advantageous to perform the reaction at higher temperatures, possibly as high as the reflux temperature of the particular solvent which is employed.

In this manner the corresponding aminocarbonyl compound of the formula IV is obtained, whose carbonyl group is then reduced into the $CH_2$-group in customary fashion, for instance with a suitable complex hydride, such as lithium aluminum hydride.

METHOD B

By ring cleavage of an isoindoline with an acyl anhydride and hydrolysis of the diacyl compound formed thereby, pursuant to the following reaction sequence:

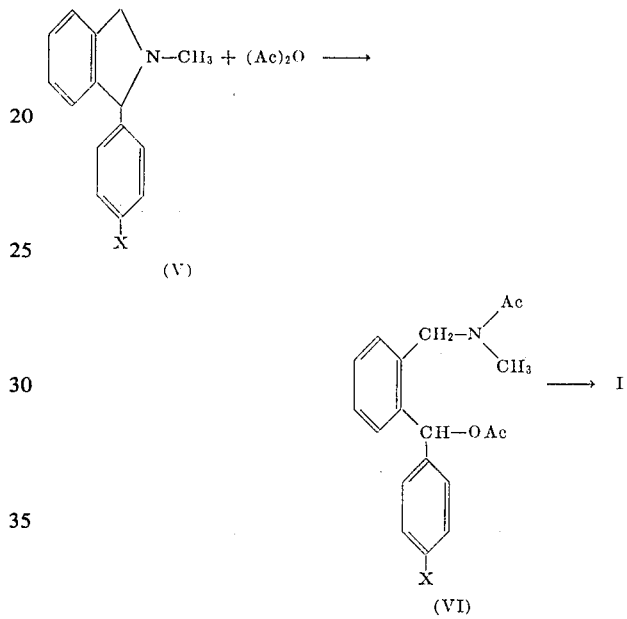

wherein Ac is acyl, preferably acetyl, and $X$ has the same meanings as in formula I.

For this reaction a compound of the formula V is dissolved in the acyl anhydride or, together with the anhydride, in a suitable inert solvent, and the solution is heated, preferably under reflux. The reaction period depends upon the reactivity of the particular reaction partners and may vary between a few minutes and several hours. After completion of the reaction the diacylated compound of the formula VI is isolated, dissolved in a suitable inert solvent and, after addition of a strong base such as an alkali metal hydroxide, the solution is heated. After the completion of the de-acylation the benzyl alcohol of the formula I is isolated by customary methods.

The compounds embraced by formula I are organic bases and therefore form acid addition salts with inorganic or organic acids. Examples of non-toxic, pharmacologically acceptable acid addition salts are those formed with hydrochloric acid, hydrobromic acid, sulfuric acid, nitric acid, phosphoric acid, perchloric acid, formic acid, acetic acid, propionic acid, oxalic acid, succinic acid, tartaric acid, citric acid, maleic acid, ascorbic acid, salicylic acid, methanesulfonic acid, toluenesulfonic acid, 8-chlorotheophylline and the like.

The compounds of the formula I comprise an asymmetric carbon atom and are obtained in the course of the synthesis in the form of racemic mixtures, unless an optically active starting compound is used. The separation of the racemic mixtures into their optically active antipode components may be effected pursuant to customary procedures, for instance by salt formation with optically active auxiliary acids, such as dibenzoyl-D-tartaric acid or (+)-3-bromo-camphor-8-sulfonic acid, subsequent fractional crystallization of the diastereomeric salts and liberation of the bases. Likewise, racemic as well as optically active starting compounds may be used in the alkylation, acylation, esterification and etherification steps of the above described method of preparation.

The starting compounds of the formula II for method A may be prepared according to known methods, for instance, by treating an O-acylbenzoic acid with zinc dust and acetic acid while heating.

Isoindolines of the formula V are prepared by Grignard reaction of a phthalimide with a compound of the formula $$X - C_6H_4 - Mg - Hal$$

wherein $X$ has the same meanings as in formula I and Hal is halogen, followed by reduction of the resulting 1-hydroxy-3-oxoisoindoline.

The following examples further illustrate the present invention and will enable others skilled in the art to understand it more completely.

EXAMPLE 1

Preparation of 2-(methylamino-methyl)-α-(4'-chloro-phenyl)-benzyl alcohol and its hydrochloride by method A a. 12.3 gm (0.05 mol) of 3-(4'-chloro-phenyl)-phthalide were dissolved in 500 ml of benzene saturated with methylamine. The solution was kept in a 1 liter round-bottom flask equipped with a calcium chloride tube for 48 hours at room temperature, and was then evaporated in a water aspirator vacuum to dryness. The residual 2-(methylamino-carbonyl)-α-(4'-chloro-phenyl)-benzyl alcohol was recrystallized from ethanol/petroleum ether; m.p. 150°–152° C; yield: 13.2 gm (97 percent of theory).

b. A solution of 13.2 gm (0.048 mol) of the above product in a mixture of 100 ml of tetrahydrofuran and 50 ml of ether, were added to a refluxing suspension of 3.8 gm (0.1 mol) of lithium aluminum hydride in 200 ml of ether, and the mixture was refluxed for 3 hours. After cooling, the excess lithium aluminum hydride was destroyed with an excess of an aqueous potassium hydroxide solution. The solids were removed by filtration, the ether phase was dried over magnesium sulfate and filtered, and the ether was removed in a water aspirator vacuum. The residue, the free base 2-(methylamino-methyl)-α-(4'-chloro-phenyl)-benzyl alcohol, was dissolved in ethanol, and hydrogen chloride was introduced into the solution, while cooling, until slightly acidic reaction.

The reaction product crystallized out upon addition of ether and was recrystallized from ethanol/ether. 9.3 gm (71 percent of theory) of the compound, m.p. 224°–227° C, of the formula

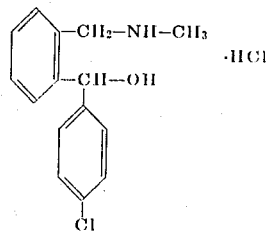

were obtained.

EXAMPLE 2

Preparation of 2-(methylamino-methyl)-α-(4'-fluoro-phenyl)-benzyl alcohol and its hydrochloride by method B a. 2-[(N-methyl-N-acetyl-amino)-methyl]-α-(4'-fluorophenyl)-O-acetyl-benzyl alcohol by method B 50 gm of 1-(4'-fluoro-phenyl)-N-methyl-isoindoline were dissolved in 500 ml of acetic acid anhydride, and the solution was refluxed for 16 hours. The major part of the excess acetic acid anhydride was then removed by evaporation in vacuo, and the concentrated solution was allowed to stand at 0° C for crystallization. The crystalline compound was vacuum-filtered off, washed with ether and dried. It had a melting point of 106° C. Yield: 51.7 gm (71.5 percent of theory).

b. A mixture of 50 gm of 2-[(N-methyl-N-acetyl-amino)-methyl]-α-(4'-fluoro-phenyl)-O-acetyl-benzyl alcohol, 125 ml of aqueous 50 percent potassium hydroxide and 250 ml of ethyleneglycol was refluxed for 1 hour. After cooling, the solution was diluted with 1,000 gm of ice and extracted with five 200 ml-portions of ether. The combined ether extracts were washed with an aqueous sodium carbonate solution, dried over magnesium sulfate and evaporated to dryness. The residue, the free base 2-(methylamino-methyl)-α-(4'-fluoro-phenyl)-benzyl alcohol, was dissolved in ethanol, and ethereal hydrochloric acid was added to the solution to precipitate the hydrochloride. The salt was recrystallized from ethanol and had a melting point of 231° C. Yield: 31.2 gm (73 percent of theory) of the compound of the formula

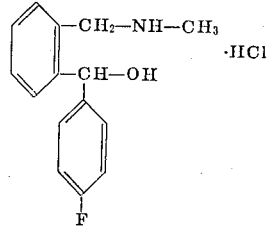

EXAMPLE 3

Separation of 2-(methylamino-methyl)-α-(4'-chloro-phenyl)-benzyl alcohol into enantiomers A hot concentrated solution of 90 gm of di-p-toluoyl-L-tartaric acid in ethanol was added to a hot concentrated solution of 61 gm of 2-(methylamino-methyl)-α-(4'-chloro-phenyl)-benzyl alcohol in ethanol. The mixture was left to crystallize overnight at room temperature. The crystals were removed by vacuum filtration, and the mother liquors were concentrated. A second crystalline fraction was obtained. The first fraction was recrystallized from ethanol. The mother liquors of this fraction were used for the recrystallization of the second fraction. This procedure was systematically repeated four times. The final two crystalline fractions were combined, and the free base was liberated with 2 N sodium hydroxide solution and taken up in ether. After drying the solution and evaporating the ether, the residue was recrystallized four times from ether/petroleum ether. Yield: 13 gm (43 percent of theory), m.p. 71–74° C, $[\alpha]_D^{25°} = +78.4°$ (ethanol).

The mother liquors of the above recrystallizations were combined, evaporated to dryness, and the base was liberated with 2 N sodium hydroxide and taken up in ether. The ether solution was dried over potassium carbonate and evaporated to dryness. 27 gm of a resin were obtained. A hot concentrated solution of 40 gm of di-p-toluoyl-D-tartaric acid in ethanol was added to a hot concentrated solution of the 27 gm of resin thus obtained in ethanol. The same procedure was repeated as described above for the first enantiomer. Yield: 10.6 gm (35% of theory), m.p. 71–74° C, $[\alpha]_D^{25°} = -80.1°$ (ethanol).

The compounds embraced by formula I above and their nonotoxic, pharmacologically acceptable acid addition salts, have useful pharmacodynamic properties. More particularly, they exhibit highly effective anorectic activities in warm-blooded animals and, in contrast to other effective anorectics, cause very minor concurrent motoric excitation.

The anorectic activity of the compounds embraced by formula I and of known closely related compounds was tested in adult laboratory rats by the standard test method of J. Spengler et al., Arch. exp. Path. u. Pharmakol. 237, 171 (1959), namely the following compounds:

A. 2-(Dimethylamino-methyl)-α-(p-chloro-phenyl)-benzyl alcohol hydrochloride

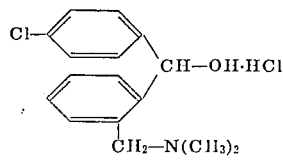

disclosed in Example 2(a) of British Pat. No. 984,363.

B. 2-(Methylamino-methyl)-α-phenyl-benzyl alcohol hydrochloride

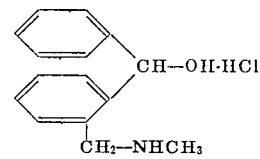

disclosed as compound V in FIG. 2 of published Dutch application No. 6,606,390.

C. 2-(Methylamino-methyl)-α-(p-chloro-phenyl)-benzyl alcohol hydrochloride, described in Example 1 above; and D. 2-(Methylamino-methyl)-α-(p-fluoro-phenyl)-benzyl alcohol hydrochloride, described in Example 2 above.

The following table shows the results obtained.

| Compound | Food consumption of controls (a) gm | Dose mgm/kg p.o. | Food consumption of treated animals (b) gm | Change % |
|---|---|---|---|---|
| Prior art | | | | |
| A | 62 | 100 | 55 | −11 |
|   | 50 | 100 | 62 | +24 |
| B | 100 | 100 | 99 | −1 |
|   | 103 | 100 | 100 | −3 |
| Invention | | | | |
| C | 69 | 60 | 36 | −48 |
|   | 76 | 60 | 38 | −50 |
| D | 91 | 60 | 52 | −43 |
|   | 85 | 60 | 46 | −46 |

(a) Food consumption of groups of 3 adult laboratory rats over 4-hour period before administration of test compounds.
(b) Food consumption of treated animals over 4-hour period beginning one hour after administration of test compound.

The results clearly show that the prior art compounds are, for all practical purposes, ineffective as anorectics at a dosage level of 100 mgm/kg p.o., whereas the compounds of the formula I above are very effective anorectics at a dosage level of only 60 mgm/kg p.o.

The substantial absence of concurrent motoric excitation was ascertained in adult laboratory rats by determining the median effective stimulating dose ($ED_{5000}$ in mgm/kg) after oral and subsutaneous administration in vibrating cages.

For pharmaceutical purposes the compounds of the formula I or their non-toxic acid addition salts are administered to warm-blooded animals, preferably perorally, as sole active ingredients or in combination with other active ingredients, such as laxatives, in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.166 to 1.67 mgm/kg body weight, preferably 0.33 to 0.84 mgm/kg body weight.

The following examples illustrate a few anorectic dosage unit compositions according to the present invention and represent the best mode contemplated of putting the invention to practical use. The parts are parts by weight unless otherwise specified.

EXAMPLE 4

Tablets

The tablet composition was compounded from the following ingredients:

| | Parts |
|---|---|
| 2-(Methylamino-methyl)-α-(4'-chloro-phenyl)-benzyl alcohol hydrochloride | 20.0 |
| Corn starch | 27.0 |
| Lactose | 247.0 |
| Polyvinylpyrrolidone | 3.0 |
| Magnesium stearate | 1.0 |
| Colloidal silicic acid | 2.0 |
| Total | 300.0 |

Compounding procedure:

The individual components were intimately admixed with each other, the mixture was granulated in customary fashion, and the granulate was compressed into 300 mgm-tablets. Each tablet contained 20 mgm of the benzyl alcohol compound and, when administered perorally to a warm-blooded animal of about 60 kg body weight, produced very good anorectic effects.

EXAMPLE 5

Gelatin Capsules

The capsule filler composition was compounded from the following ingredients:

| | Parts |
|---|---|
| 2-(Methylamino-methyl)-α-(4'-fluoro-phenyl)-benzyl alcohol hydrochloride | 25.0 |
| Corn starch | 175.0 |
| Total | 200.0 |

Compounding procedure:

The ingredients were intimately admixed with each other, and 200 mgm-portions of the mixture were filled into gelatin capsules of suitable size. Each capsule contained 25 mgm of the benzyl alcohol compound and, when administered perorally to a warm-blooded animal of about 60 kg body weight, produced very good anorectic effects.

EXAMPLE 6

Coated Sustained-release Pills

The pill core composition was compunded from the following ingredients:

| | Parts |
|---|---|
| 2-(Methylamino-methyl)-α-(4'-chloro-phenyl)-benzyl alcohol hydrochloride | 20.0 |
| Carboxymethyl cellulose | 300.0 |
| Stearic acid | 20.0 |
| Cellulose acetate phthalate | 40.0 |
| Total | 380.0 |

Compounding procedure:

The benzyl alcohol compound, the carboxymethyl-cellulose and the stearic acid were intimately admixed with each other, and the mixture was granulated in customary fashion, using a solution of the cellulose acetate phthalate in 200 ml of a mixture of ethanol and ethylacetate. The granulate was compressed into 380 mgm-pill cores, which were then coated with an aqueous solution of polyvinylpyrrolidone containing 5 percent sugar. Each coated pill contained 20 mgm of the benzyl alcohol compound and, when administered perorally to a warm-blooded animal of about 60 kg body weight, produced very good anorectic effects.

Analogous results were obtained when an equal amount of another non-toxic acid addition salt of one of the compounds embraced by formula I above was substituted for the particular salt in Examples 4 to 6. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An anorectic composition in dosage unit form consisting essentially of an inert pharmaceutical carrier and an effective anorectic amount of a compound of the formula

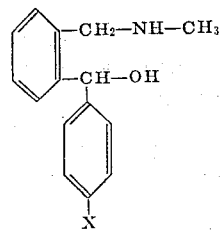

wherein $X$ is a fluoro or chloro atom, or a non-toxic, pharmacologically acceptable acid addition salt thereof.

2. The method of curbing the appetite of a warm-blooded animal, which comprises administering to said animal an effective anorectic amount of a compound of the formula

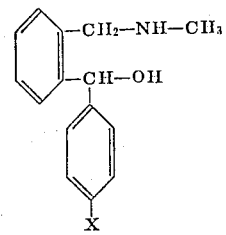

wherein $X$ is a fluoro or chloro atom, or a non-toxic, pharmacologically acceptable acid addition salt thereof.

* * * * *